United States Patent [19]

Calder et al.

[11] Patent Number: 5,716,711
[45] Date of Patent: Feb. 10, 1998

[54] METHOD FOR MINE SUPPORT AND COMPOSITION

[75] Inventors: Peter N. Calder; James Archibald, both of Kingston; Frank Maine, Guelph, all of Canada

[73] Assignee: Canadian Mining Industry Research Organization—Organisation de Recherche de l'Industrie Miniere Canadienne, Ontario, Canada

[21] Appl. No.: 801,821

[22] PCT Filed: Jun. 19, 1991

[86] PCT No.: PCT/CA91/00223

§ 371 Date: Dec. 29, 1993

§ 102(e) Date: Dec. 29, 1993

[87] PCT Pub. No.: WO91/19690

PCT Pub. Date: Dec. 26, 1991

(Under 37 CFR 1.47)

Related U.S. Application Data

[63] Continuation of Ser. No. 955,706, Dec. 29, 1993, abandoned.

[30] Foreign Application Priority Data

Jun. 19, 1990 [GB] United Kingdom ............... 9013665

[51] Int. Cl.$^6$ ............... B32B 27/40; C04B 41/48; C04B 41/52; E21D 11/38
[52] U.S. Cl. ............... 428/425.5; 156/287; 156/294; 405/150.2; 427/202; 427/204; 427/205; 427/385.5; 427/393.6; 427/407.1; 427/419.5; 428/423.1
[58] Field of Search ............... 156/287, 294; 405/150.2; 427/202, 204, 205, 385.5, 393.6, 407.1, 419.5; 428/423.1, 425.5

[56] References Cited

U.S. PATENT DOCUMENTS

| | | | |
|---|---|---|---|
| 3,502,500 | 3/1970 | Hoock | 428/425.5 |
| 3,756,845 | 9/1973 | Zasadny et al. | 428/425.5 |
| 4,066,578 | 1/1978 | Murch et al. | 260/2.5 AG |
| 4,095,985 | 6/1978 | Brown | 106/15 FP |
| 4,237,182 | 12/1980 | Fulmer et al. | 428/310 |
| 4,261,670 | 4/1981 | Paban | 405/150 |
| 4,269,628 | 5/1981 | Ballard et al. | 106/86 |
| 4,607,066 | 8/1986 | Barry et al. | 523/130 |
| 4,877,829 | 10/1989 | Vu et al. | 524/729 |

FOREIGN PATENT DOCUMENTS

| | | |
|---|---|---|
| 0294704 | 12/1988 | European Pat. Off. ......... C08K 5/52 |
| 2526014 | 11/1983 | France . |
| 3343212A | 6/1985 | Germany . |

OTHER PUBLICATIONS

Chemical Abstracts, vol. 112 No. 18 Abstract No. 164046B Apr. 30, 1990.

World Patent Index Latest, Derwent Publications Ltd., London, GB. & JP-A-55039568 (Sanyo Chem. Ind. Ltd.) Mar. 20, 1980.

Chemical Abstracts, vol. 112, No. 18, Apr. 30, 1990, Columbus, Ohio, US; Abstract No. 164046B, T. Sniezek et al 'Polymer coating for concrete and ceramic surfaces' see abstract & PL,A,134 524 ("Polifarb" Cieszynska Fabryka Farb I Lakierow), Aug. 31, 1985.

Chemical Abstracts, vol. 106, No. 10, Mar. 1987, Columbus, Ohio, US; Abstract No. 72051X, J. Sodai et al 'Nonflammable roofing shingles' p. 321; column 1; See Abstract & JP,A,61 225 375 (Nissin Kogyo Co., Ltd.) Oct. 7, 1986.

*Primary Examiner*—D. S. Nakarani
*Attorney, Agent, or Firm*—Watson Cole Stevens Davis, P.L.L.C.

[57] ABSTRACT

A method and composition for providing gas-impermeable, adherent, flexible, and fire retardant coatings to rock and the like surfaces whereby the rock is supported by the caisson effect and mechanical strength properties of the coatings. The method comprises spraying a two-component polymer such as polyurethane onto a rock surface and spraying a layer of inorganic particulate material such as unexfoliated vermiculite onto the said coating of polymer with or without concurrent application of further layers of said polymer before completion of curing of the coating whereby the particulate material adheres to the polymer. An aqueous dispersion of inorganic particulate material such as vermiculite which may be in the exfoliated form can be applied onto the coating.

15 Claims, No Drawings

METHOD FOR MINE SUPPORT AND COMPOSITION

This application is a Continuation of application Ser. No. 07/955,706, filed Dec. 29, 1993, now abandoned.

BACKGROUND OF THE INVENTION

1. Field of the Invention

This invention relates to a method for providing support to rock surfaces such as found in mine openings and, more particularly, relates to a method for providing gas-impermeable coatings on rock, masonry and concrete surfaces, specifically coatings which are fire retardant, which provide support to mine openings, and which prevent the flow of gases such as radon gas.

2. Description of the Related Art

The application of linings to the walls of mine openings to provide local restraint for rock masses such as by the spraying of a coating of shotcrete/gunite is known. It is believed that the cementing action of the coating on adjacent parts of rock fractures, due to the shear strength of the coating material, a possible "caisson" support effect, and the protection of rock faces from deterioration due to oxidation, strengthens the wall rock. The application of shotcrete/gunite is expensive and the linings are brittle and are lacking in significant tensile strength, and are prone to fracturing upon flexing of the rock such as during mine blasting activities or rock bursting.

It is an object of the present invention to provide a relatively inexpensive, flexible, air-tight coating having good tensile strength on wall surfaces to induce the caisson effect to avoid fracturing of rock and to actively resist spalling, bursting and localized gravity falls of loose rock.

Rock, concrete and masonry walls and floors are sufficiently gas permeable to allow radon gas infiltration driven by air convection (i.e. by pressure-driven air) into quarters such as residential and industrial sites.

It is another object of the invention therefore to provide a tight coating which is substantially gas impermeable to prevent the diffusion of noxious gases such as radon gas into residential and industrial sites.

Gas impermeable coatings such as polyurethane polymers are not strongly resistant to ignition and flame consumption and will burn with substantial smoke production once ignited.

It is a further object of the present invention to provide an inexpensive, flexible, air-tight coating on wall surfaces, such as mine wall surfaces, which is fire resistant.

SUMMARY OF THE INVENTION

In its broad aspect, the method of the present invention comprises applying, such as by spraying, an adherent coating of a plastic material such as polyurethane which has a rapid cure rate and which contains a fire retardant material onto rock and the like surfaces to provide a gas-tight fire resistant lining whereby the rock is supported by the caisson effect and the mechanical strength properties of the adherent coating.

The method of the invention preferably comprises spraying a two-component polymer such as polyurethane as a coating onto a rock surface for curing thereon and spraying a layer of inorganic particulate material such as unexfoliated vermiculite onto the said coating of polymer with or without concurrent application of further layers of said polymer before completion of curing of the coating whereby the particulate material adheres to the polymer coating. An aqueous dispersion of inorganic particulate material such as vermiculite, which may be in the exfoliated form, can be applied onto the initial coating.

The plastic material preferably is a composition which can be applied easily by spraying as a uniform coating at high application rates to form an air-tight membrane, has gap filling and covering capabilities (in excess of 2 mm wide gap coverage), has sufficient elasticity to deform readily under tension (between 5–15% strain without breaking) and is readily adhesive to rock surfaces including rock surfaces that are not totally dry.

In its broad aspect, the composition of the invention comprises a coating or layer of two-component polymer such as polyurethane. The coating preferably includes a layer of inorganic, particulate material such as unexfoliated vermiculite applied to the polymer surface prior to completion of curing of the polymer. The layer of said inorganic, particulate material can be applied to the polymer surface concurrently with a second coating of said two-component polymer.

An aqueous dispersion of vermiculite, preferably in the exfoliated form, can be applied onto the unexfoliated vermiculite to adhere thereto and to form a continuous, fire-retardant inorganic surface.

A chemical fire retardant such as a chlorinated phosphate ester can be present in the polymer.

DESCRIPTION OF THE PREFERRED EMBODIMENT

The method and composition of the invention will now be described with reference to the following non-limitative examples.

EXAMPLE 1

Layers of two-component polyurethane-based materials were sprayed with plural component urethane spray equipment incorporating an impingement-type mixer gun on a teflon base and manufactured as distinct material sheets. The polyurethane-based material was a solvent free elastomer sold by Urylon Canada under the trade-mark URYLON MINEGARD Rx 7. URYLON MINEGARD Rx 7 has the following properties:

| Tensile strength | ASTM-D 638 | 1995 p.s.i. |
|---|---|---|
| Elongation | ASTM-D 638 | <200% |
| Hardness | ASTM-D 2440 | 80 ± 5 Shore A |
| Water absorption | ASTM-D 570 | 1.5% after 7 days at 72° F. |
| Adhesion to steel | In house procedure | 105 p.i.w. (no primer) |
| Temperature range | | −20° F. to 350° F. |
| Acid resistance | In house procedure | Very Good |
| Base resistance | In house procedure | Very Good |

The polyurethane was applied in a 1:1 ratio, by volume, of A:B components for 5 Imperial gallons to cover 100 square feet to provide a polymer thickness of about 0.1 inch. The polyurethane cured within about 3 seconds and a layer of unexfoliated vermiculite, sold by W. R. Grace as Vermiculite No. 7, was sprayed onto the polyurethane surface before completion of curing. Curing of the polyurethane can be readily controlled for curing within the range of about 1 to 30 seconds, a short curing time normally being preferred.

An aqueous dispersion of exfoliated vermiculite, typified as sold by W. R. Grace under the trade-mark MICROLITE 903, was applied by spraying onto the layer of unexfoliated vermiculite to adhere thereto.

Flammability/blast exposure tests were conducted on the following coatings: (1) polyurethane coating, (2) polyurethane coating with an effective amount of chlorinated phosphate ester chemical fire retardant, (3) polyurethane coating with said chemical fire retardant and a layer of unexfoliated vermiculite (vermiculite No. 7) and (4) polyurethane coating with said chemical fire retardant and a layer of unexfoliated vermiculite (vermiculite No. 7) plus a surface coating of vermiculite aqueous emulsion (MICROLITE 903™).

Three variations for flame testing were utilized to assess the flammability potential of each of the coating agent materials fabricated. All tests were established following modified guideline procedures which are utilized by the Underwriters Laboratories of Canada by evaluating flame spread potential of surface layers under laboratory conditions.

In each case, different flame sources were applied to the surface of a layer of material which was held rigidly within a test frame. All layers tested were cut to a standard size approximating 15 cm by 15 cm and were placed within a holding frame in contact with a 2.0 cm thick rock slab for backing. All materials were positioned within the test stand such that the angle of flame impact against the layer surface was held at 90°; flame offset distances were rigorously set and measured such that constant surface contact temperatures could be maintained upon layers during all flame trials. In the majority of tests, test layers were permitted initially to rest against the rock slab surface, but were not directly applied or permitted to adhere directly to the rock.

Two direct flame sources were utilized, these being a high velocity propane jet (at measured contact temperature approximating 780°–850° C.) and a low velocity bunsen burner jet (at measured contact temperature approximating 480°–520° C.). A final heat source, that being a radiant heating device capable of sustaining surface contact temperatures of 250°–270° C., was utilized to examine low temperature effects.

Samples of each of the four materials were subjected to each of the high temperature sources, with two variations of exposure to each source being permitted. In one form of exposure, cyclic heating was permitted to occur (10 seconds exposure to the heat source followed by 10 seconds of source removal). In the other form, continuous heat source exposure was permitted.

Variables which were assessed during such trials consisted of: layer perforation time (jet or heat penetration through the layer thickness, either by material burn-through or melting); char diameter (diameter of the zone to which the flame or heat source was applied and which yielded noticeable surface physical degradation, melting or discolouration); and perforation diameter (diameter of the zone to which the flame or heat source was applied and which yielded noticeable melt-through or perforation).

The following observations were made:
i) Coatings (2), (3) and (4) were successful in preventing flame propagation upon flame source removal; during flame application, however, molten polyurethane while in contact with the flame was consumed by the flame.
ii) The three materials of coatings (2), (3), and (4), were demonstrated to be capable of extinguishing flames upon removal of direct flame heating sources.
iii) Coating (1) material burned both during and after flame application in propane and bunsen gas jet tests. Such material was shown to be highly flammable, and would therefore sustain flame should it be exposed to open flame sources of similar temperature regimes underground.

EXAMPLE 2

Several samples of coatings having the same compositions as coatings (3) and (4) described in Example 1 were directly sprayed onto rock slab surfaces to form a bonded coating. Under continuous exposure to propane and bunsen jet flame sources, minimal surface perforation and material burning, as well as no evidence of flame propagation, were observed.

Optimum response was demonstrated by coating (4)—no surface perforation occurred and only minor surface charring took place after long exposure to the highest temperature flame source.

EXAMPLE 3

All four formulations from Example 1 were exposed to shock and temperature wave effects of detonation in close proximity (0.5 meters) to 150 grams of Magnafrac 5000™ commercial emulsion explosive (single stick), in a sealed 1 $m^3$ chamber. In one case, 75 grams of Detasheet™ military plastic explosive (known to support a significant flame front upon detonation) was also utilized. No damage was sustained by any of the materials in such tests.

None of the retained chamber gas samples, obtained following detonation, evidenced any decomposition gas products other than those which have been known, through monitoring, to result from explosive decomposition alone. This observation demonstrated that no thermal decomposition of layer materials occurred following high pressure and temperature exposure to explosive detonations.

EXAMPLE 4

A series of four flame spread (FSC) and smoke production (SD) tests were conducted on the coatings such as described in Example 1, each coating being applied to three 6 mm thick cement boards, each 2.44 meters in length. The tests were conducted by the Canadian Underwriter's Laboratories (ULC) in a tunnel test in accordance with the Surface Burning Characteristics Guideline for Building Construction, in which:

" . . . the surface burning characteristics of a material are expressed in terms of a classification or rating which provide data in regard to (1) flame spread (FSC) and (2) smoke developed (SD) during fire exposure of the classified materials in comparison with inorganic reinforced cement board as zero and untreated red oak lumber as 100 when exposed to fire under similar conditions."

The test equipment consisted of a horizontal tunnel, 7.6 meters long, 450 mm wide and 300 mm deep, which had a removable roof. The roof was lined with a low density, non-flammable, mineral composition surface and the walls and floor were lined with refractory fire brick. Flames from two natural gas burners, placed at one end, were forced down the tunnel length by a steady airflow stream at a set velocity of 1.2 m/s. The flames, of fixed length equal to 1.37 meters, impinged directly upon the test layer surface which was affixed to the roof of the tunnel structure. The tunnel was calibrated by adjusting the rate of heat release of the burners so that it took approximately 5.5 minutes for flames to reach the exhaust end of the tunnel when the specimen consisted of a reference material, taken to be an 18 mm thickness of select-grade red oak.

In the exhaust end of the tunnel apparatus, both a light/photoelectric sensor and thermocouple monitor were placed for measuring smoke intensity and temperatures achieved in the downstream end of the apparatus during burning.

The FSC of a material is determined following placement of the test material on the tunnel roof and burner ignition. During the ignition process, the advance of the flame front along the test specimen length is recorded for a ten minute interval. The method of FSC determination has been established such that the rating for noncombustible, inorganic board (typically cement board) is zero, while the rating for red oak is set at 100. In general, the larger the FSC rating exhibited, the faster a fire will grow when such substances are exposed to flame. In a similar fashion, the smoke production rating is measured relative to that of red oak, taken as a standard rating of 100.

Typical FSC rating values for other common building materials include:

| | |
|---|---|
| 6 mm thickness of Douglas fir plywood | 135 |
| 12.7 mm thickness of gypsum wallboard | 15 |
| loose fill cellulose insulation | 55 |
| polyurethane foam insulation | 427 |

Building Code requirements which use such rating values are set to ensure that, should structural walls and ceilings become involved in a fire in its early stages, they will not spread flames so quickly that occupants of structures cannot escape. Generally, the lower the flame spread rating, the more time is available to permit escape. Materials which exhibit rating values of 25, close to that of gypsum wallboard, are assumed to be safe for high risk exposure sites. In other structural areas, such as in hospitals or prisons where limited mobility conditions exist, the building code regulates the use of material having (FSC) rating values of 75 or less. In residential dwellings, as another example, interior finish materials used on walls are required to exhibit flame spread ratings of 150 or less.

In structures where burning materials can contribute to rapid temperature increases (approximately 500°–600° C.), "flashover" or explosive ignition of combustible materials may result. This danger condition has been related to the FSC rating for construction materials in the following manner, as a means of comparison:

- for structures lined with gypsum board (FSC=15), no flashover can occur
- for structures whose roof and walls are lined with 6 mm Douglas fir plywood (FSC=135), the time to flashover approximates 3 minutes or less
- in structures lined with polyurethane foam (FSC>425), the time to flashover can be as low as 13 seconds.

The results of tests based on flame spread distance vs. time after initial burner ignition are summarized in Table I.

TABLE I

Summary of Tunnel Test Results

| Material Type | Flame Spread Classification | Smoke Rating | Comments |
|---|---|---|---|
| Polyurethane | 220.2 | 291.8 | Surface burn progression over complete length of coated panels; complete surface removal of layer over initial 3 meter length |
| Polyurethane & Fire Retardant | 201.6 | 179.2 | Surface burn progression over 90% of full length |

TABLE I-continued

Summary of Tunnel Test Results

| Material Type | Flame Spread Classification | Smoke Rating | Comments |
|---|---|---|---|
| | | | of coated panels; partial layer removal over initial 3 meter length |
| Polyurethane, Fire Retardant & Unexfoliated Vermiculite | 43.0 | 233.8 | Surface burn progression over 50% of full length of coated panels; partial layer melting over initial 3 meter length |
| Polurethane, Fire Retardant, Unexfoliated Vermiculite & emulsion wash | 61.0 | 231.1 | Surface burn progression over 90% of full length of coated panels; partial layer melting over initial 3 meter length |

Coatings (3) and (4), each constituting polyurethane with a chemical fire retardant and surface-bonded vermiculite additions (one with an emulsion wash, the other without as described in Example 1) exhibited exceptional flame spread ratings, with coating (3) demonstrating a FSC value which is less than double that for standard gypsum board.

For each of the vermiculite-impregnated layer materials, layer melting was shown to be restricted locally to that initial burn zone where direct flame contact was maintained (within 1.37 meters of source); at positions downstream from the burner flame, some degree of surface bubbling was noted to occur, though bonding integrity to the tunnel roof was consistently maintained.

Both the polyurethane coating (1) and polyurethane and fire retardant coating (2) were shown to be susceptible to significant flame progression accompanied by layer removal in the intial 3 meter tunnel length; the coating (2) version, though less susceptible to flame consumption than coating (1), did evidence considerably more flame advance and melting than either of the vermiculite-coated forms of coating material typified by coatings (3) and (4).

EXAMPLE 5

Tests were conducted to evaluate possible airborne contamination and respiratory hazards to workers resulting from the spraying of polyurethane in underground mine workings.

When completely reacted, polyurethane raw materials, being a methylene bisphenyl isocyanate (MDI) mixture (Part A) and a polyol resin curative agent (Part B), form a solid polyurethane product, i.e. unfoamed polyurethane product, which offers no respirable hazard to exposed workers. When such agents remain unreacted, however, the airborne contaminants likely to be generated are unreacted MDI, polymerized isocyanates (polyisocyanates) with some additional unreacted chemical agents and unreacted polyol. In order to assess any measure of airborne contamination hazard associated with polyurethane spraying underground, a sampling protocol was developed to assess potential exposure to MDI, polyisocyanates and associated chemical agent materials.

The primary (and certified) technique presently used by the Ministry of Labour of Ontario, comprises a chemical impinger method in which contaminant chemical agents, in a known volume of air, are bubbled through and preferentially absorbed into specific liquid solutions. Such solutions are analysed following collection to determine contaminant concentrations existing at the time of collection. A secondary technique, experimentally adopted for purposes of comparison and field evaluation, utilizes a proprietary colourimetric stain indicator system for concentration assessment. When specific chemicals are exposed to indicator materials (e.g. chemically-impregnated paper tape), a colour change develops which can be used to provide a measure of the unknown chemical concentration existing. Colourimetric indicating systems have been designed with the capability to monitor specifically for isocyanate agent materials. In the system used, automatic sampling at two minute intervals was capable of providing continuous instantaneous site monitoring coverage of airborne contamination levels for periods of up to twenty hours. The monitors are described in Table 2.

TABLE 2

MDI Sampling Apparatus

| Monitor Type | Description of Equipment | Detection Technique and Sampling Range |
| --- | --- | --- |
| Autostep™ Model 925 MDI Dector (GMD Systems Inc. Hendersonville, PA.) versus standard | Automatic, portable, colourimetric stain sampler, capable of operating for 20 hours continously with samples taken at 2 minute intervals; sampler calibrated accuracy of L.E.D./photodiode response cards. | continuous stain indicator-type sampling unit, with sampling ranges set at either 0–40 ppb, 0–20 ppb or 0–10 ppb; readings quoted at +15% of reading or 1 ppb, whichever is greater. |
| Liquid Chemical Impinger System | Double impinger chamber system through which airborne contaminants are drawn. Impingers contain 2–15 ml reagent solutions in series which trap specific chemical contaminants. Typical sampling intervals for single inpinger tests vary between 25–112 minutes | Contaminant, drawn in rate of 1 L/min, is absorbed by reagent solution and then measured for concentration by liquid chromatographic or ion chromatographic analysis in separate laboratory sites. Minimum sampling detection level quoted as 1.0 ug, equating to air-borne concentration levels in the approximate order of less than 1 ppb. |

During polyurethane application, mechanical exhaust ventilation was provided through a 75 cm diameter duct which was placed within an air receiver chamber. A total of four sampling sites were selected and used during two shifts of spray application to assess airborne contamination potential of the polyurethane product.

The polyurethane installation trial at the Kidd Creek #2 Mine in Ontario, Canada was conducted over two weekend shifts, originally planned to take place over a total installation period of 16 hours duration. Two separate shifts on the first weekend were required to completely coat the air receiver chamber with an intial polyurethane lining. The great majority of the exposed rock face was completely covered by a single, thick layer coating. In a few sites, primarily in a zone of localized shear and on the back (ceiling), large fractures could not be totally bridged and remained partially open.

A second quantity of polyurethane material was applied during a second weekend in order to provide further sealing capability, i.e. to completely seal the air receiver chamber.

During all application trials, no adhesion problems were noted to occur when the polyurethane was applied directly to dusty and irregular rock surfaces. In addition, no evident excess runoff or flow of the coating was observed either on the side walls or on the chamber back as the material was initially applied in liquid form. Bonded layers were also observed to set smoothly and to exhibit generally uniform layer thicknesses except where additional coating layers were necessarily applied to fill evident cracks or fracture gaps.

In the first application during weekend 1, approximately 682 kg of polyurethane were applied to a rock surface area approximating 215.5 $m^2$. The side walls, back and end face of the chamber, over a total length of chamber approximating 13.8 meters, were sprayed during the initial application.

In the second application, during weekend 1 also, approximately 1590 kg of polyurethane were applied to the remaining air receiver chamber rock surface area approximating 872.5 $m^2$. Both the remaining side walls and back areas, as well as the total chamber floor surface area, were sprayed.

A total weight of polyurethane material approximating 3640 kg (8,000 pounds) was installed during the entire test. Air quality measurements were taken by staff of the Ministry of Labour of Ontario both during and after the installation trials. The time weighted average exposure of a worker for an eight hour day and a forty hour work week cannot exceed 5 parts per billion, (ppb), nor, at any time, exceed an instantaneous exposure level of 20 ppb. A series of four monitoring sites were established at strategic locations to provide sufficient coverage on the mine level, both within the chamber and in the downstream air flow, of airborne contamination associated with isocyanate use. In view of the fact that unreacted isocyanates may combine with moisture to form carbon dioxide reaction products, a water scrubber was installed within the exhaust duct and operated during one half of the application trial for comparative purposes.

Over the two shift periods during which the polyurethane was applied on weekend 1, four timed intervals of MDI concentration measurement were performed using the Autostep™ continous monitor. Similar site measurements were taken using the impinger technique. The automatic, colourimetric sampling unit was used to provide continuous monitoring capability over periods of up to 27 minutes duration to sample airborne concentrations of MDI at two sites. Simultaneous impinger measurements were taken adjacent to these sites and at two additional downstream locations.

It was observed that the Autostep™ continuous monitor indicated that peak time-weighted average concentration measurement levels approximating 3.5 ppb MDI existed at the chamber face, within meters of the spray apparatus when in use. Impinger method measurements, being the certified technique in use within the Province of Ontario, indicated peak time weighted average MDI concentrations to exist at levels approximating 2.0 ppb for a similar site location. All concentrations of spray byproducts measured downstream from the discharge end of the ventilation duct were below the limit of detection of the sampling and analytical techniques used. The application of polyurethane during both shifts generated concentrations of 2 ppb of MDI. The ventilation rate of 40 fpm past the workers while spraying 6.4–8.4 lbs/min of polyurethane appeared to be adequate to control exposures below the required safe limits of any possibly hazardous chemicals.

In summary, coatings (3) and (4) which incorporated surface-bonded exfoliated and unexfoliated vermiculite were shown to demonstrate excellent flame retardant characteristics, coating (3) yielding an FSC rating of 43 and coating (4) yielding an FSC rating of 61. Both these coatings meet Canadian National Building Code flame spread resistance specifications for both residential and workplace environments. Coatings (1) and (2) provide good wall support and, although not yielding acceptable FSC ratings, provide effective gas-tight coatings which are suitable for use where fire retardance is not a consideration.

It will be understood, of course, that modifications can be made in the embodiment of the invention illustrated and described herein without departing from the scope and purview of the invention as defined by the appended claims.

We claim:

1. A two layer structure for coating surfaces for providing a gas-tight, flexible fire retardant coating onto a concrete, masonry or rock surface which structure comprises a layer of solvent-free, elastomeric unfoamed polyurethane having a hardness of 80±5 Shore A, an elongation of less than 200% and a tensile strength sufficient to prevent localized gravity falls of loose rock, concrete or masonry, said polyurethane having a layer of vermiculite bonded onto the polyurethane.

2. A structure as claimed in claim 1 in which the vermiculite is unexfoliated.

3. A structure as claimed in claim 2 in which the unfoamed polyurethane contains a chlorinated phosphate ester in an amount effective as a fire retardant.

4. A structure as claimed in claim 3 additionally comprising a layer of vermiculite adhered onto the vermiculite bonded onto the polyurethane to form a continuous, gas-impermeable, fire-retardant surface.

5. A structure as claimed in claim 4 in which the vermiculite in the layer is exfoliated.

6. A structure as claimed in claim 5 substantially impermeable to radon gas.

7. A structure for coating surfaces for providing a gas-tight, flexible, fire retardant coating onto a rock, concrete or masonry surface, which structure comprises a layer of solvent-free, elastomeric unfoamed polyureathane having a hardness of 80±5 Shore A, an elongation of less than 200% and a tensile strength sufficient to resist localized gravity falls of loose rock, concrete or masonry.

8. A structure as claimed in claim 7 in which the unfoamed polyureathane contains a chlorinated phosphate ester in an amount effective as a fire retardant.

9. A method for providing support to rock surfaces in mine openings which comprises applying an adherent unfoamed coating of polyurethane which has a rapid cure time within the range of about 1 to 30 seconds, a hardness of 80±5 Shore A, with a fire retardant onto the rock surfaces to provide a gas-tight flexible lining having sufficient elasticity to deform under tension prevalent in mine openings without breaking whereby the rock is supported by the caisson effect and by the tensile and shear strength properties of the lining, thereby resisting spalling, bursting and localized gravity falls of rock.

10. A method for coating surfaces for providing a gas-tight, flexible, fire retardant, unfoamed coating having sufficient elasticity to deform under tension prevalent in mine openings without breaking which comprises spraying a coating of a two-component polyurethane polymer having a rapid cure time in the range of about 1 to 30 seconds, a hardness of 80±5 Shore A, onto a rock surface in a mine opening for rapid curing thereon, and spraying a layer of vermiculite onto the polymer coating before completion of curing whereby the vermiculite adheres to the polymer.

11. A method as claimed in claim 10 in which the layer of vermiculite is unexfoliated vermiculite which is sprayed onto the coating of polyurethane.

12. A method as claimed in claim 11 additionally comprising applying an aqueous dispersion of an inorganic particulate material comprised of vermiculite onto the coating.

13. A method as claimed in claim 11 additionally comprising applying an aqueous dispersion of an inorganic particulate material comprised of exfoliated vermiculite onto the coating.

14. A method as claimed in claim 10 in which the layer of vermiculite is unexfoliated vermiculite which is sprayed onto the coating of polyurethane concurrently with a second application of polyurethane to form a layer of vermiculite.

15. A method as claimed in claim 14 in which said polyurethane contains a chlorinated phosphate ester in an amount effective as a chemical fire retardant.

* * * * *